United States Patent [19]

Bernsen et al.

[11] Patent Number: 5,054,095

[45] Date of Patent: Oct. 1, 1991

[54] METHOD OF RECOGNIZING A PATTERN IN A FIELD HAVING A MULTI-VALENT AMPLITUDE, AND DEVICE FOR PERFORMING SUCH A METHOD

[75] Inventors: Johannes A. C. Bernsen, Eindhoven; Reinier van den Boomgaard, The Hague, both of Netherlands

[73] Assignee: U.S. Philips Corp., New York, N.Y.

[21] Appl. No.: 390,327

[22] Filed: Aug. 7, 1989

[30] Foreign Application Priority Data

Aug. 23, 1988 [NL] Netherlands .......................... 8802078

[51] Int. Cl.$^5$ .............................................. G06K 9/62
[52] U.S. Cl. ........................................ 382/30; 382/50; 382/49
[58] Field of Search .................... 382/50, 49, 8, 51, 30; 358/447, 448, 450, 452

[56] References Cited

U.S. PATENT DOCUMENTS 4,491,962 1/1985 Sakou et al. ............................ 382/50
4,491,964 1/1985 Sanner ................................... 382/50

Primary Examiner—Michael Razavi
Attorney, Agent, or Firm—Jack D. Slobod

[57] ABSTRACT

A method of recognizing a pattern in a field having a multi-valent amplitude, and a device for performing the method, uses association with a reference mask which is composed of logic high units and logic low units. The reference mask is sub-divided into two sub-masks, units having the same logic value belonging to the same sub-mask. The first and the second sub-mask contain relevant logic high units and logic low units, respectively. After the positioning of the sub-masks in the field, a relatively lowest and a relatively highest value of the amplitude are determined within the window of the first and the second sub-mask, respectively. When the difference formed by the relatively lowest value minus the relatively highest value is not negative, the desired pattern can in principle be recognized in the field. The device for performing the method includes at least one rank-value filter for determining the relatively highest value and the relatively lowest value. There is also determined the sign of the difference between the relatively lowest value and the relatively highest value.

23 Claims, 2 Drawing Sheets

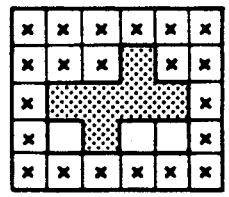
FIG.1
FIG.2
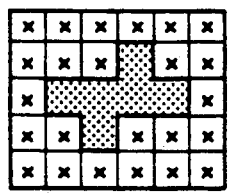
FIG.3
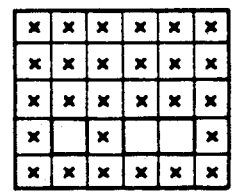
FIG.4
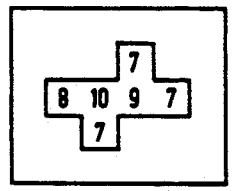
FIG.5
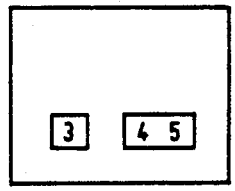
FIG.6
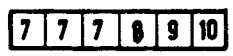
FIG.7
FIG.8
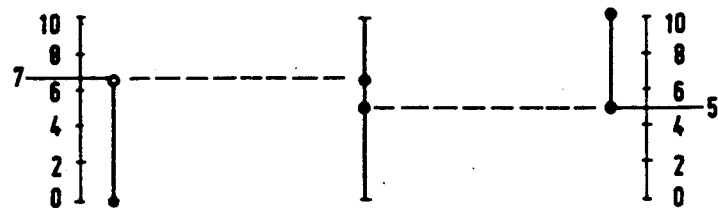
FIG.9

METHOD OF RECOGNIZING A PATTERN IN A FIELD HAVING A MULTI-VALENT AMPLITUDE, AND DEVICE FOR PERFORMING SUCH A METHOD

BACKGROUND OF THE INVENTION

The invention relates to a method of recognizing a pattern in a field having a multi-valent amplitude by association with a reference mask which is composed of logic high and logic low units.

The invention also relates to a device for performing such a method.

A method and device of the kind set forth are known from the German Offenlegungsschrift DE-OS 32.10.814 corresponding to U.S. Pat. No. 4,491,962 in versions which relate to the recognition of patterns in video images composed of pixels of different grey values.

The known method converts the multi-valent video image into several images with binary units, each image being converted on the basis of a different discrimination threshold. Parts of several of these images, which parts correspond to one another as regards location, are compared with a binary reference mask which represents the desired pattern. The degree of correspondence between a part of an image considered and the reference mask is then determined by the number of units in the relevant part which have the same logic value as the units of the reference mask which correspond thereto as regards location. This degree of correspondence is a discrimination threshold dependent quantity.

As the most suitable discrimination threshold for the thresholding of the video image in order to detect and localize the desired pattern, the discrimination threshold is used for which the cumulative degree of correspondence between each of the relevant parts of the thresholded video image on the one hand and the reference mask on the other hand is maximum.

In accordance with the known method, the transformation of the video image by thresholding must be performed with all feasible thresholds before a maximum degree of correspondence can be found wherefrom the presence or absence of the desired pattern can be deduced. When thresholding with the various thresholds is successively performed and when a customary number of thresholds is used (for example, 256 different thresholds), the overall thresholding operation is time consuming. When thresholding of the input image is simultaneously performed for all thresholds, expensive facilities will be required for the parallel thresholding of 256 video images and for keeping the transforms ready for subsequent operations.

SUMMARY OF THE INVENTION

Therefore, it is one of the objects of the invention to provide a faster and less complex method of recognizing a pattern in a field of multi-valent amplitude.

To achieve this, a method in accordance with the invention is characterized in that the reference mask is sub-divided into a first sub-mask with relevant logic high units and a second sub-mask with relevant logic low units, the method comprising the steps of:
positioning the sub-masks in the field;
determining a relatively lowest value and a relatively highest value of the amplitude in a respective area of the field within a relevant window of the positioned first and second sub-masks, respectively;
recognizing the pattern when a difference between the relatively lowest value and the relatively highest value is not negative.

When the field of multi-valent amplitude were discriminated to a field of binary amplitude on the basis of a discrimination threshold which is lower than said relatively lowest value, at least a first area of the field, in which the amplitude is higher than the relatively lowest value, would be mapped onto the logic high value. Similarly, when discrimination were to take place on the basis of a discrimination threshold higher than said relatively highest value, at least a second area of the field, in which the amplitude is lower than the relatively highest value, would be mapped onto the logic low value. When the difference: relatively lowest value minus relatively highest value is not negative, upon discrimination with a discrimination threshold situated between these values, the first area would be mapped onto the logic high value and the second area would be mapped onto the logic low value. Instead of the actual execution of the discrimination of the field of multi-valent amplitude for the pattern detection, it suffices using a method in accordance with the invention to determine the sign of a difference between a relatively lowest value and a relatively highest value of the amplitude, measured within the window of the first sub-mask and within the window of the second sub-mask, respectively.

A further version of a method in accordance with the invention is characterized in that recognition of the pattern occurs when the non-negative difference exceeds a predetermined value. As the difference is larger than a predetermined value, only patterns whose presence is more pronounced in the image are accepted for recognition.

Another version of a method in accordance with the invention is characterized in that the relatively highest value and the relatively lowest value are determined as follows:
sorting the values of the amplitude according to magnitude, representative for location in the field within the relevant window of the relevant sub-mask;
determining a value which occupies the extreme position, except for a predetermined respective difference number, in a relevant order thus generated.

Sorting produces an ordened set of values. By counting down it is simple to determine the value which is the extreme one in the relevant order except for the relevant difference number. This value is then equated with the relatively highest or the relatively lowest value, respectively. As a relevant difference number becomes higher, the difference between this relatively lowest and relatively highest value also increases. This implies inter alia that a pattern which is not recognized in the case of low difference numbers will be recognized in the case of higher difference numbers. The difference numbers thus represent a degree of tolerance for the recognition of the pattern.

It is another object of the invention to provide a device for executing a method in accordance with the invention. A device in accordance with the invention is characterized in that for the sorting of the values according to magnitude there is provided at least one rank-value filter for outputting a value at a predetermined location in the order.

Rank-value filters are known per se, for example the L 64220, make LSI Logic Corporation. A rank-value filter calculates a predetermined rank in an order of magnitude of the input values, for example within a predetermined window of M×K values, its output quantity being the value at the predetermined rank. Usually such rank-value filters are used for suppressing a given kind of noise. The device in accordance with the invention utilizes a rank-value filter for determining the relatively highest and relatively lowest values.

An embodiment of a device in accordance with the invention is characterized in that there are provided a first rank-value filter and a second rank-value filter which are coupled to one another at the input side.

Thus, at least two sub-masks can be simultaneously compared with one and the same field.

A further embodiment of a device in accordance with the invention is characterized in that the rank-value comprises:

a comparator for receiving at least two values, for comparing these at least two values, and for outputting a highest one or a lowest one of these at least two values;

a coupling from an output of the comparator to one input of the comparator.

This embodiment comprises a very simple rank-value filter. The value which has been found to be the highest or the lowest value during a preceding comparison is applied again to the comparator for comparison with at least one current, other value applied to the comparator.

Another embodiment of a device in accordance with the invention is characterized is that the predetermined position in the order is adjustable.

By making the position in the order adjustable, various recognition tolerances can be used.

BRIEF DESCRIPTION OF THE DRAWINGS

The invention will be described with reference to a drawing; therein

FIG. 1 shows an example of a field to be examined which has a multi-valent amplitude and which in this case comprises discrete elements;

FIG. 2 shows an example of a reference mask which contains a desired pattern expressed in binary units;

FIGS. 3 and 4 show respective sub-masks which together represent the pattern of FIG. 2;

FIGS. 5 and 6 show the respective sub-sets of elements which are compared with the respective sub-masks of the FIGS. 3 and 4;

FIGS. 7 and 8 illustrate the sorting as regards magnitude of the relevant elements of the FIGS. 5 and 6;

FIG. 9 illustrates a coherence between the relatively lowest value and the relatively highest value for the example of the preceding FIGURES.

DETAILED DESCRIPTION OF THE PREFERRED EMBODIMENTS

Figure 10:
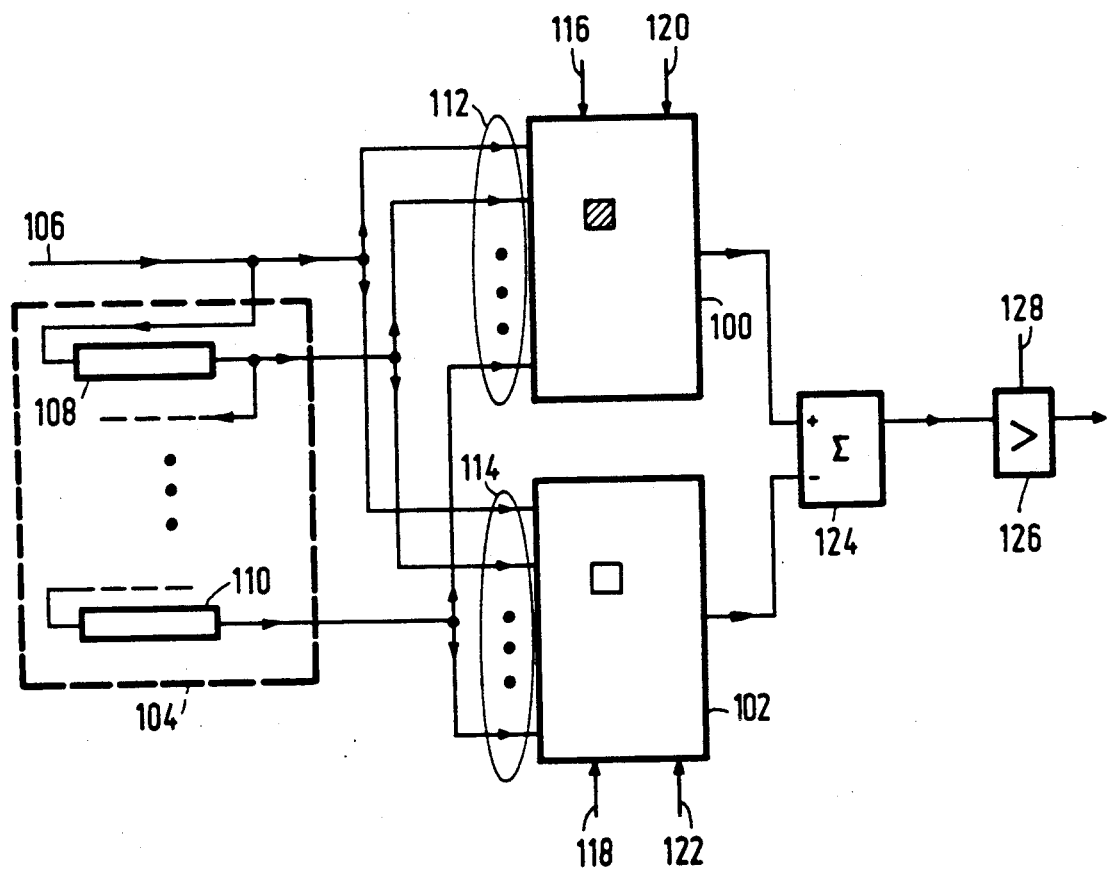
FIG. 10 shows an embodiment of a device in accordance with the invention.

FIG. 1 shows, by way of example, a two-dimensional field with a multi-valent amplitude and discrete elements. The value of each element is denoted by a numeral.

Within the context of, for example pattern recognition in video images, these numerals represent the gray values of the pixel. In the case of, for example remote sensing applications, the numerals represent values of a measured quantity, for example a temperature or a distance from a reference point, in which case a predetermined coherence is pursued between the measured values and their mutual orientation.

It is to be noted that the use of a method or a device in accordance with the invention is not restricted to the two-dimensional fields of the example shown in FIG. 1. The use of a method in accordance with the invention with one-dimensional fields consists, for example in the search for a predetermined pattern in a (distorted) digital signal. A use of a method in accordance with the invention with three-dimensional fields consists, for example in the search for a predetermined pattern in a data field obtained by computer tomographic examination of an object. It is also to be noted that the field to be examined, having a multi-valent amplitude, need not be sub-divided into (similar) element as shown by way of example in FIG. 1. A continuous field can also be examined for a given pattern, provided that representative discrete values are assigned to parts of the field considered upon association with the sub-masks.

FIG. 2 shows an example of a reference mask containing a pattern expressed in logic units. The dark units are the units having a logic high value and the light units are the units having a logic low value; the units denoted by a cross are units whose logic values are irrelevant.

According to the conventional method, during the thresholding of the field, like that shown in FIG. 1, a relevant element having a given value is mapped onto a unit having the logic high value on the logic low value, if for example the given value is higher than the discrimination threshold or lower than or equal to the discrimination threshold, respectively. For example, if all relevant units of the pattern shown in FIG. 2 correspond, as regards logic value and location, to the relevant units in the thresholded image of the field of FIG. 1, the pattern has been recognized in this image.

In order to detect the desired pattern in the field, the procedure in accordance with the invention is as follows. The reference mask is sub-divided into two sub-masks, a first sub-mask specifying in which locations in the pattern relevant units having the logic high value should occur (FIG. 3), a second sub-mask specifying in which locations in the pattern relevant units having the logic low value should occur (FIG. 4). Each of the sub-masks of the FIGS. 3 and 4 comprises only units having one logic value and units whose logic value is irrelevant.

The field of FIG. 1 is associated with the sub-mask shown in the FIGS. 3 and 4. Within the window of the first sub-mask of FIG. 3 the relevant elements of the field are the elements whose location corresponds to the relevant unit of the first sub-mask. The relationship and the values of these elements are shown in FIG. 5. Similarly, FIG. 6 shows the relationship and the values of the elements which are relevant for association with the second sub-mask of FIG. 4.

Subsequently, the values of the relevant elements of the FIGS. 5 and 6 are sorted according to magnitude as shown in the FIGS. 7 and 8, respectively. In FIG. 7, the lowest value equals "7" and the highest value equals "10". In FIG. 8 the lowest value equals "3" and the highest value equals "5". If all elements of FIG. 5 were to be mapped onto units having the logic high value upon thresholding, the discrimination threshold should be lower than the value "7". This is shown in the left-hand bar of FIG. 9. The discrimination thresholds suitable for the logic high value would then be situated in the interval between "0" and "7" which is closed to the left and open to the right. Similarly, if the elements of FIG. 6 were to be mapped onto units having the logic low value upon thresholding, the discrimination threshold should be higher than "5" or equal to "5". This is shown in the right-hand bar of FIG. 9. The discrimination threshold suitable for the logic low value would then be situated in the closed interval between "5" and "10". The central bar of FIG. 9 shows the overlap of said intervals. A discrimination threshold within this overlap would be suitable for mapping the elements shown in FIG. 5 onto units of logic high value as well as for mapping the elements shown in FIG. 6 onto units of logic low value. In the case of a discrimination threshold situated in the interval between "5" and "7" which is closed to the left and open to the right, the field shown in FIG. 1 would be mapped, upon thresholding, onto a configuration of binary units with which both sub-masks match. In the method in accordance with the invention, pattern detection does not involve thresholding and the subsequent comparison with the reference mask. Instead, extreme values of the amplitude are measured and subsequently the sign of the difference between these extreme values is determined. The determination of the extreme values could be considered as the determination of extreme levels of the discrimination threshold where the respective sub-masks are still recognized when the field is thresholded. The determination of the sign of the difference could be considered as the checking whether or not the previously mentioned intervals overlap.

In addition to the condition that overlap occurs, for recognition of the pattern in the field it may also be stipulated that an overlap of the intervals must exceed a predetermined length.

The greater an overlap must be, the larger a difference will be pattern on the one side the relatively lowest value in the set of values of elements which would be mapped onto units having the logic high value upon thresholding and on the other side the relatively highest value in another set of elements which would be mapped onto units having the logic low value upon thresholding. This implies inter alia that, in order to be detected, the presence of a pattern in the field considered must be more pronounced.

In the foregoing the recognition has been made subject, by way of example, to the condition that the difference between the lowest of all values within the relevant window of the first sub-mask and the highest of all values within the relevant window of the second sub-mask should be non-negative.

A further recognition condition will be described hereinafter. It is assumed that the values of the amplitude are sorted according to magnitude within the relevant window of the respective sub-mask. For relatively lowest value now the value is taken which occupies the lowest position, except for a first difference number, in the order relating to the window of the first sub-mask. For the relatively highest value now the value is used which occupies the highest position, except for a second difference number, in the order relating to the window of the second sub-mask. It is to be noted that the difference, being equal to the relatively lowest value minus the relatively highest value, is greater as the relevant difference numbers are higher. For the example illustrated in the FIGS. 1 to 8 where, for example a first difference number is "2" and a second difference number is "1", the foregoing means that the relatively lowest value is (still) equal "7" and the relatively highest value is equal to "4". With respect to the case described with reference to FIG. 9, the overlap, being the difference between the relatively lowest value and the relatively highest value, has increased by one unit. If the field of FIG. 1 were thresholded with a discrimination threshold situated in the overlap, the values within the window of FIG. 5 would all be mapped onto logic high units. The values "3" and "4" within the window of FIG. 6 would be mapped onto logic low units. The value "5", however, can be mapped onto a logic high unit because the discrimination threshold may then be below "5". This implies that upon thresholding of the field a deviation of the second sub-mask which amounts to at the most one unit can arise, but recognition still takes place. The determination of the relatively lowest and the relatively highest value in the relevant order by means of the respective difference numbers thus corresponds, in the case of thresholding, to the acceptance of binary fields for recognition which deviate from the relevant sub-mask by no more than a relevant difference number of units.

FIG. 10 shows an embodiment of a part of a device in accordance with the invention. This FIG. shows the rank-value filters 100 and 102, each of which acts on the same window of at the most M×K multi-valent elements. The output quantity of a rank-value filter is the value of the element which occupies a predetermined position (rank) in an order of magnitude of the values of the elements in the window. Such a rank-value filter, for example the L64220 by LSI Logic Corporation, is used inter alia for removing a given type of noise. The two-dimensional field of multi-valent elements is assumed to be composed of rows having a length of N elements each in the present example. In order to load the rank-value filters with element values there is provided a register 104 which successively receives the value data of elements of successive rows via data input 106. The register 104 is composed in known manner of M−1 serially coupled delay lines, each of which has a delay of N elements. For the sake of clarity only two delay lines 108 and 110 are shown. Inputs 112 of the rank-value filter 100 and inputs 114 of the rank-value filter 102 are interconnected in a two-by-two fashion. Neighbouring pairs of inputs of one and the same rank-value filter receive the same series of data, be it shifted over a distance of N elements.

Via selection input 116 of the rank-value filter 100, the elements whose values are to be sorted according to magnitude are selected in the current window. These are the elements which during the current interrogation step, have a location which corresponds to a location of a relevant unit in the first sub-mask (see the FIGS. 3 and 5). Similarly, via selection input 118 of the rank-value filter 102 the elements are selected which, during the current discrimination step, have a location which corresponds to a location of a relevant unit in the second sub-mask (see the FIGS. 4 and 6). The data at the selection inputs 116 and 118 thus represent the first and the second sub-mask, respectively.

Via the rank setting 120 of the rank-value filter 100, the value which is arranged as the lowest value in the relevant order, except for any first difference number $N_1$, is selected as the output quantity. Via the rank setting 122 of the rank-value filter 102, the value which is the highest, except for any second difference number $N_2$, in the relevant order is selected as the output quantity.

The values thus selected are applied to a difference circuit 124 for determining a difference between the selected values. This difference is subsequently applied to a comparator 126 which compares the difference with a reference value on input 128. If said difference exceeds the reference value, the pattern has been recognized in the window; if said difference is smaller, the pattern has not been recognized.

We claim:

1. A method of recognizing a pattern in a field of multi-valent amplitudes by using a reference mask which is composed of a reference pattern of logic high and logic low units for comparison with the amplitudes in said field, characterized in that the reference mask is sub-divided into a first sub-mask containing only certain of said logic high units defining a first window and a second sub-mask containing only certain of said logic low units defining a second window, said first and second windows having fixed relative positions in the reference mask, the m ..od comprising the steps of:
   positioning the first and second windows in the field in said fixed relative positions;
   determining a relatively lowest value of the amplitudes in the field within the first window and a relatively highest value of the amplitudes in the field within the second window; and
   recognizing the pattern when a difference formed by subtracting said relatively highest value from said relatively lowest value is not negative.

2. A method as claimed in claim 1, wherein said recognizing occurs when the non-negative difference exceeds a predetermined value.

3. A method as claimed in claim 1, wherein said relatively highest value and said relatively lowest value are determined as follows:
   sorting in an order according to magnitude the values of the amplitudes in the field within the relevant window; and
   determining a value which occupies an extreme position in said order, except for a predetermined respective difference number.

4. A device for recognizing a pattern in a field of multi-valent amplitudes by using a reference mask which is composed of a reference pattern of logic high and logic low units for comparison with the amplitudes in said field, characterized in that the reference mask is sub-divided into a first sub-mask containing only certain of said logic high units defining a first window and a second sub-mask containing only certain of said logic low units defining a second window, said first and second windows having fixed relative positions in the reference mask, the device comprising:
   means for receiving first and second sets of amplitudes from said field respectively within said first and second windows, when said windows are positioned in said field in said fixed relative positions;
   means for determining a relatively lowest value of the amplitudes in the first set and a relatively highest value of the amplitudes in the second set;
   means for forming a difference by subtracting said relatively highest value from said relatively lowest value; and
   means for recognizing the pattern in response to said difference being non-negative.

5. A device as claimed in claim 4, wherein said determining means comprises at least one rank-value filter configured for sorting the values of the amplitudes within the relevant set in an order according to magnitude and outputting a value at a predetermined position in the order.

6. A device as claimed in claim 5, wherein said determining means comprises a first rank-value filter for sorting the values of the amplitudes within the first set and a second rank-value filter for sorting the values of the amplitudes within the second window.

7. A device as claimed in claim 5, wherein the rank-value filter comprises:
   a comparator for receiving at least two values, for comparing these at least two values, and for outputting a highest one or a lowest one of these at least two values;
   a coupling from an output of the comparator to one input of the comparator.

8. A device as claimed in claim 5, wherein the predetermined position in the order is adjustable.

9. A device as claimed in claim 5, further comprising selection means for selecting the parts which are relevant for the sorting of the values according to magnitude.

10. A device as claimed in claim 9, characterized in that the selection means are adjustable.

11. A device as claimed in claim 5, wherein the rank-value filter comprises programmed means.

12. A device as claimed in claim 9, wherein the selection means comprises further programmed means.

13. A method as claimed in claim 3, characterized said recognizing of the pattern occurs when the non-negative difference exceeds a predetermined value.

14. A device as claimed in claim 6, characterized in that each of the first and second rank-value filters comprise:
   a comparator for receiving at least two values, for comparing these at least two values, and for outputting a highest one of a lowest one of these at least two values;
   a coupling from an output of the comparator to one input of the comparator.

15. A device as claimed in claim 6, wherein the predetermined position in the order is adjustable.

16. A device as claimed in claim 6, further comprising selection means for selecting the parts which are relevant for the sorting of the values according to magnitude.

17. A device as claimed in claim 7, further comprising selection means for selecting the parts which are relevant for the sorting of the values according to magnitude.

18. A method of detecting a predetermined pattern in a field of signal samples of multi-valent amplitudes by association with a reference mask related to said predetermined pattern and positionable with respect to said field, which mask comprises a first submask defining a first window onto said field and a second submask defining a second window onto said field said first and second submasks having having a fixed relative position with respect to each other in said mask such that said first and second windows do not overlap, said method comprising:
   positioning said first and second submasks with respect to said field so as to maintain said fixed relative position;
   receiving first and second sets of signal samples from said field respectively within said first and second windows;

selecting a first amplitude from the signal amplitudes in said first subset based on the relative rank in amplitude of said first amplitude in said first set;

selecting a second amplitude from the signal amplitudes in said second set based on the relative rank in amplitude of said second amplitude in said second set;

subtracting said first signal amplitude from said second signal amplitude to form a difference signal; and signalling detection of said pattern in response to said difference signal being equal to or greater than a predetermined value.

19. The method of claim 18, wherein at least one of said selecting steps comprises selecting the amplitude having a predetermined rank order position among the signal amplitudes of the relevant set.

20. The method of claim 18, wherein said first amplitude has a first predetermined rank order position relative to the highest amplitude among the signal amplitudes of the first set and the second amplitude has a second predetermined rank order position relative to the lowest amplitude among the signal amplitudes of the second set.

21. A method of detecting a predetermined pattern in a field of signal samples of multi-valent amplitude by association with a reference mask related to said predetermined pattern and positionable with respect to said field, which mask is subdivided into a first submask defining a first window onto said field and a second submask defining a second window onto said field, said method comprising:

positioning said first and second submasks with respect to said field to select first and second subsets of signal samples from said field respectively within said first and second windows;

selecting a first amplitude from the signal amplitudes in said first subset based on the relative rank in amplitude of said first amplitude in said first subset;

selecting a second amplitude from the signal amplitudes in said second subset based on the relative rank in amplitude of said second amplitude in said second subset;

subtracting said first signal amplitude from said second signal amplitude to form a difference signal; and signalling detection of said pattern in response to said difference signal being equal to or greater than a predetermined value.

22. The method of claim 21, wherein at least one of said selecting steps comprises selecting the amplitude having a predetermined rank order position among the signal amplitudes of the subset.

23. The method of claim 21, wherein said first amplitude has a first predetermined rank order position relative to the highest amplitude among the signal amplitudes of the first subset and the second amplitude has a second predetermined rank order position relative to the lowest amplitude among the signal amplitudes of the second subset.

* * * * *